United States Patent
Satou (10) Patent No.: US 9,689,978 B2
(45) Date of Patent: Jun. 27, 2017

(54) IN-VEHICLE RADAR APPARATUS

(71) Applicant: DENSO CORPORATION, Kariya, Aichi-pref. (JP)

(72) Inventor: Kouichi Satou, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 204 days.

(21) Appl. No.: 14/758,151

(22) PCT Filed: Dec. 27, 2013

(86) PCT No.: PCT/JP2013/085117
§ 371 (c)(1),
(2) Date: Jun. 26, 2015

(87) PCT Pub. No.: WO2014/104298
PCT Pub. Date: Jul. 3, 2014

(65) Prior Publication Data
US 2016/0003941 A1    Jan. 7, 2016

(30) Foreign Application Priority Data
Dec. 27, 2012  (JP) .................................. 2012-284578

(51) Int. Cl.
*G01S 13/46* (2006.01)
*G01S 13/93* (2006.01)
*G01S 13/00* (2006.01)

(52) U.S. Cl.
CPC ............ *G01S 13/46* (2013.01); *G01S 13/931* (2013.01); *G01S 2013/462* (2013.01); *G01S 2013/9375* (2013.01)

(58) Field of Classification Search
CPC .......... G01S 13/02; G01S 13/06; G01S 13/46; G01S 2013/462; G01S 13/88;
(Continued)

(56) References Cited

U.S. PATENT DOCUMENTS

| 4,901,083 A * | 2/1990 | May ..................... G01S 13/931 342/128 |
| 7,525,478 B2 * | 4/2009 | Takano ................. G01S 13/878 342/145 |

(Continued)

FOREIGN PATENT DOCUMENTS

| JP | 2005-069739 | 3/2005 |
| JP | 3761888 | 3/2006 |
| JP | 2011117896 | 6/2011 |

OTHER PUBLICATIONS

International Search Report (translated version); International Application No. PCT/JP2013/085177, filed Dec. 27, 2013; 8 pages.
(Continued)

*Primary Examiner* — Bernarr Gregory
(74) *Attorney, Agent, or Firm* — Knobbe, Martens, Olson & Bear, LLP (57) ABSTRACT

An in-vehicle radar apparatus includes a transmission and reception means which transmits a radar wave ahead of an own vehicle and receives a reflected wave corresponding to the radar wave from a target; a reception strength detection means which repeatedly detects reception strength of the reflected wave; a distance detection means which repeatedly detects a distance from the own vehicle to the target; an approximate expression calculation means which calculates an approximation expression expressing the reception strength using the distance as a variable from the reception strength repeatedly detected by the reception strength detection means and the distance repeatedly detected by the distance detection means; and a determination means which determines a height of the target from a road surface based on values of coefficients of the approximation expression.

8 Claims, 6 Drawing Sheets

(58) Field of Classification Search
CPC .......... G01S 13/93; G01S 13/931; G01S 2013/9371; G01S 2013/9375; G01S 13/87; G01S 13/878
See application file for complete search history.

(56) References Cited

U.S. PATENT DOCUMENTS

| | | | | |
|---|---|---|---|---|
| 7,623,061 | B2* | 11/2009 | Spyropulos | G01S 13/931 342/170 |
| 8,606,539 | B2* | 12/2013 | Takabayashi | G01S 13/931 180/169 |
| 8,648,745 | B2* | 2/2014 | Kanamoto | G01S 13/931 342/108 |
| 8,907,840 | B2* | 12/2014 | Kanamoto | G01S 13/931 342/107 |
| 2011/0221628 | A1* | 9/2011 | Kamo | G01S 13/931 342/70 |

OTHER PUBLICATIONS

International Preliminary Report on Patentability; International Application No. PCT/JP2013/085117; Filed: Dec. 27, 2013 (with English translation).

* cited by examiner

IN-VEHICLE RADAR APPARATUS

CROSS-REFERENCE TO RELATED APPLICATION

This application is based on and claims the benefit of priority from earlier Japanese Patent Application No. 2012-284578 filed on Dec. 27, 2012, the description of which is incorporated herein by reference and made a part of the present disclosure.

BACKGROUND

Technical Field

The present invention relates to an in-vehicle radar apparatus which can detect a target by transmitting and receiving a radar wave.

Background Art

Conventionally, an in-vehicle radar apparatus has been known which transmits a radar wave ahead of (in the travel direction of) an own vehicle and receive a reflected wave corresponding to the radar wave from a target to detect the target (refer to patent literature 1). When the in-vehicle radar apparatus detects a target ahead of the own vehicle, a collision avoidance process (for example, a process of applying the brake of the own vehicle, a process of changing the direction of travel of the own vehicle by steering, or the like) can be performed.

CITATION LIST

Patent Literature

[Patent Literature 1] Japanese Patent No. 3761888

SUMMARY OF INVENTION

Technical Problem

The in-vehicle radar apparatus may detect a target such as a signboard above a road and a bridge pier, which are present ahead of the own vehicle, and under which the own vehicle can pass. The collision avoidance process is not required to be performed for these targets.

However, the conventional in-vehicle radar apparatus cannot discriminate between the target under which the own vehicle can pass, described above, and the target with which the own vehicle can collide. Hence, the conventional in-vehicle radar apparatus performs the target collision avoidance process without exception when detecting any target.

Solution to Problem

An embodiment provides an in-vehicle radar apparatus which can determine the height of a target from a road surface.

An in-vehicle radar apparatus of an embodiment includes a transmission and reception means which transmits a radar wave ahead of an own vehicle and receives a reflected wave corresponding to the radar wave from a target; a reception strength detection means which repeatedly detects reception strength of the reflected wave; a distance detection means which repeatedly detects a distance from the own vehicle to the target; an approximate expression calculation means which calculates an approximation expression expressing the reception strength using the distance as a variable from the reception strength repeatedly detected by the reception strength detection means and the distance repeatedly detected by the distance detection means; and a determination means which determines a height of the target from a road surface based on values of coefficients of the approximation expression.

DESCRIPTION OF EMBODIMENTS

Embodiments of the present invention are described with reference to the drawings.

First Embodiment

1. Configuration of In-Vehicle Radar Apparatus 1

Figure 1:
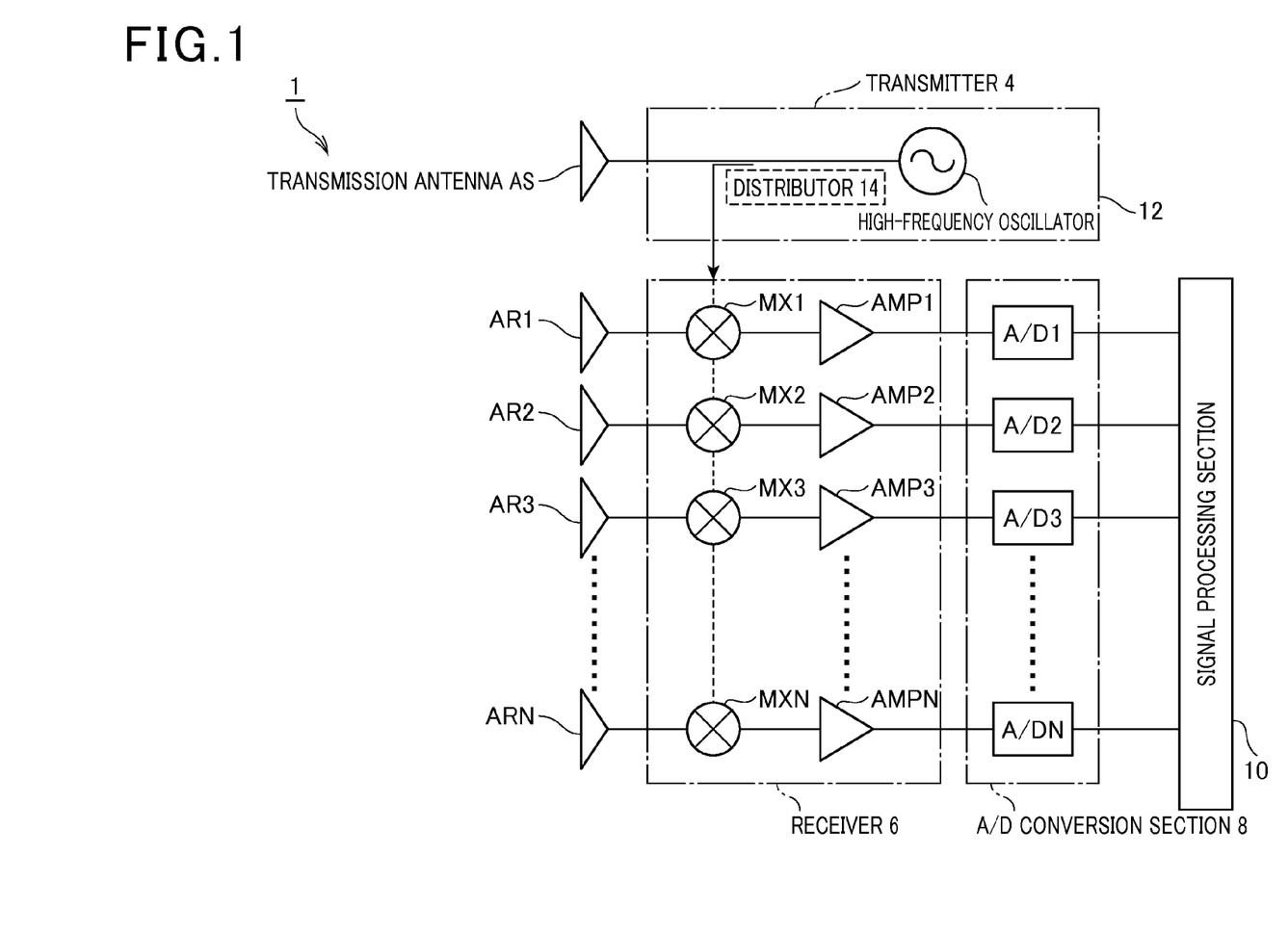
FIG. 1 is a block diagram showing a configuration of an in-vehicle radar apparatus 1.

The configuration of the in-vehicle radar apparatus 1 is described with reference to FIG. 1. The in-vehicle radar apparatus 1 includes a transmitter 4, an N-channel receiver 6, an A/D conversion section 8, and a signal processing section 10. The transmitter 4 transmits radar waves in a millimeter wave band ahead of an own vehicle (vehicle installing the in-vehicle radar apparatus 1) via a transmission antenna AS. The receiver 6 receives radar waves (hereinafter, referred to as reflected waves), which are transmitted from the transmitter 4 and reflected from a target such as a preceding vehicle and a roadside object, by N reception antennas AR1 to ARN arranged in a line and at regular intervals, and generates N beat signals B1 to BN described later. The A/D conversion section 8 includes N A/D converters A/D1 to A/DN which respectively sample the beat signals B1 to BN generated by the receiver 6 and convert them into digital data D1 to DN. The signal processing section 10 performs various signal processes based on the digital data D1 to DN taken via the A/D converters A/D1 to A/DN.

The transmitter 4 includes a high-frequency oscillator 12 and a distributor 14. The high-frequency oscillator 12 generates high-frequency signals in a millimeter wave band which are modulated so that frequencies repeat gradual increase and gradual decrease in a linear manner with respect to time. The distributor 14 performs power distribution of the output of the high-frequency oscillator 12 to a transmission signal Ss and a local signal L. The transmitter 4 provides the transmission signal Ss to the transmission antenna AS and provides the local signal L to the receiver 6.

Meanwhile, the receiver 6 includes high frequency mixers MXi and amplifiers AMPi. Each of the high frequency mixers MXi respectively corresponding to the reception antennas ARi (i=1 to N) mixes a reception signal Sri thereof with the local signal L, and generates a beat signal Bi which is a frequency component of the difference between these signals. The amplifier AMPi amplifies the beat signal Bi. Note that the amplifier AMPi also has a filter function of removing unnecessary high-frequency components from the beat signal Bi.

Hereinafter, the configurations MXi, AMPi, A/Di, which correspond to the reception antennas ARi, for generating the digital data Di from the reception signals Sri are collectively referred to as a reception channel chi.

Note that, in the present embodiment, the half-value angle of the antenna is set to 20° (−10 to +10° when the front direction of the own vehicle is defined as 0°). In addition, the reception antennas AR1 to ARN are horizontally arranged. The arrangement interval thereof is set to 7.2 mm. The high-frequency oscillator 12 is set so as to generate a radio wave with a wavelength of 3.9 mm (about 77 GHz).

According to the in-vehicle radar apparatus 1 configured as described above, a radar wave formed of frequency-modulated continuous waves (FMCW) is transmitted from the transmitter 4 via a transmission antenna AS, and a reflected wave thereof is received by each of the reception antennas AR1 to ARN.

Then, in each of the reception channels chi, the mixer MXi mixes the reception signal Sri received from the reception antenna ARi with the local signal L received from the transmitter 4 to generate the beat signal Bi which is a frequency component of the difference between the reception signal Sri and the local signal L. The amplifier AMPi amplifies the beat signal Bi and removes unnecessary high-frequency components. Thereafter, the A/D converter A/Di repeatedly samples the beat signal Bi and converts it to the digital data Di.

The signal processing section 10 is mainly configured by a known microcomputer including a CPU, a ROM, and a RAM. The signal processing section 10 includes an input port receiving data from the A/D conversion section 8 and a digital signal processor (DSP) for performing a fast Fourier transformation (FFT) process.

The signal processing section 10 performs a target detection process. In the target detection process, the signal processing section 10 detects a target every time when a measurement period has elapsed which includes uplink modulation, in which the frequency of the transmission signal Ss increases, and downlink modulation, in which the frequency decreases, based on the digital data Di sampled by the A/D conversion section 8 during the measurement period, and calculates the distance to the detected target, relative speed with respect to the detected target, and the direction to the detected target.

In the above target detection process, the digital data Di is subject to the FFT process for each of the channels to specify frequency components based on the reflected waves received from targets to detect the targets. In addition, for each of the detected targets, the distance x from the own vehicle to the target and the relative speed of the target with respect to the own vehicle are calculated by using a known method concerning the FMCW radar.

In addition, for each of the detected targets, the direction to the target is calculated based on the information on a phase difference $\Delta\theta$ between the channels of the frequency components based on the same target. Note that the specific method of calculating the direction uses the information on the phase difference $\Delta\theta$, and can use signal processes such as, for example, DBF and ESPRIT.

In addition, the signal processing section 10 detects the reception strength y of the reflected wave. The reception strength y means the strength of the electric power described above.

Note that the transmitter 4, the receiver 6, and the A/D conversion section 8 are one embodiment of a transmission and reception means. In addition, the signal processing section 10 is one embodiment of a reception strength detection means, a distance detection means, an approximate expression calculation means, and a determination means.

2. Process Performed by In-Vehicle Radar Apparatus 1

Figure 2:
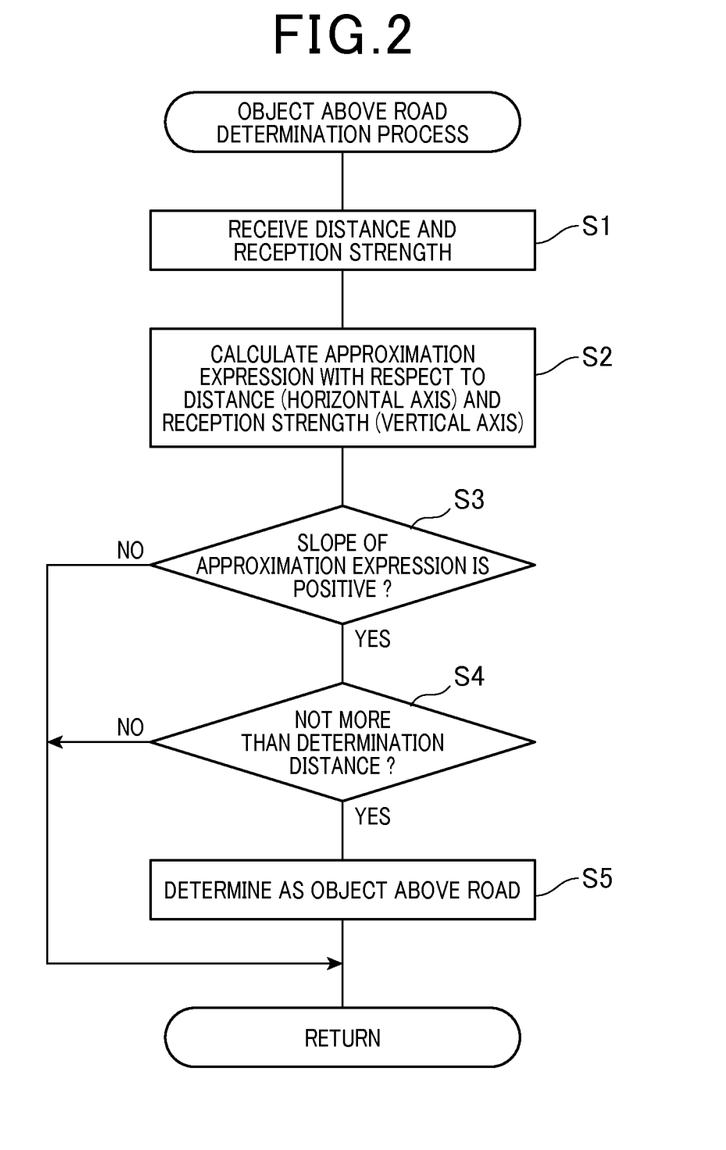
FIG. 2 is a flowchart showing an object above road determination process performed by the in-vehicle radar apparatus 1.
Figure 3:
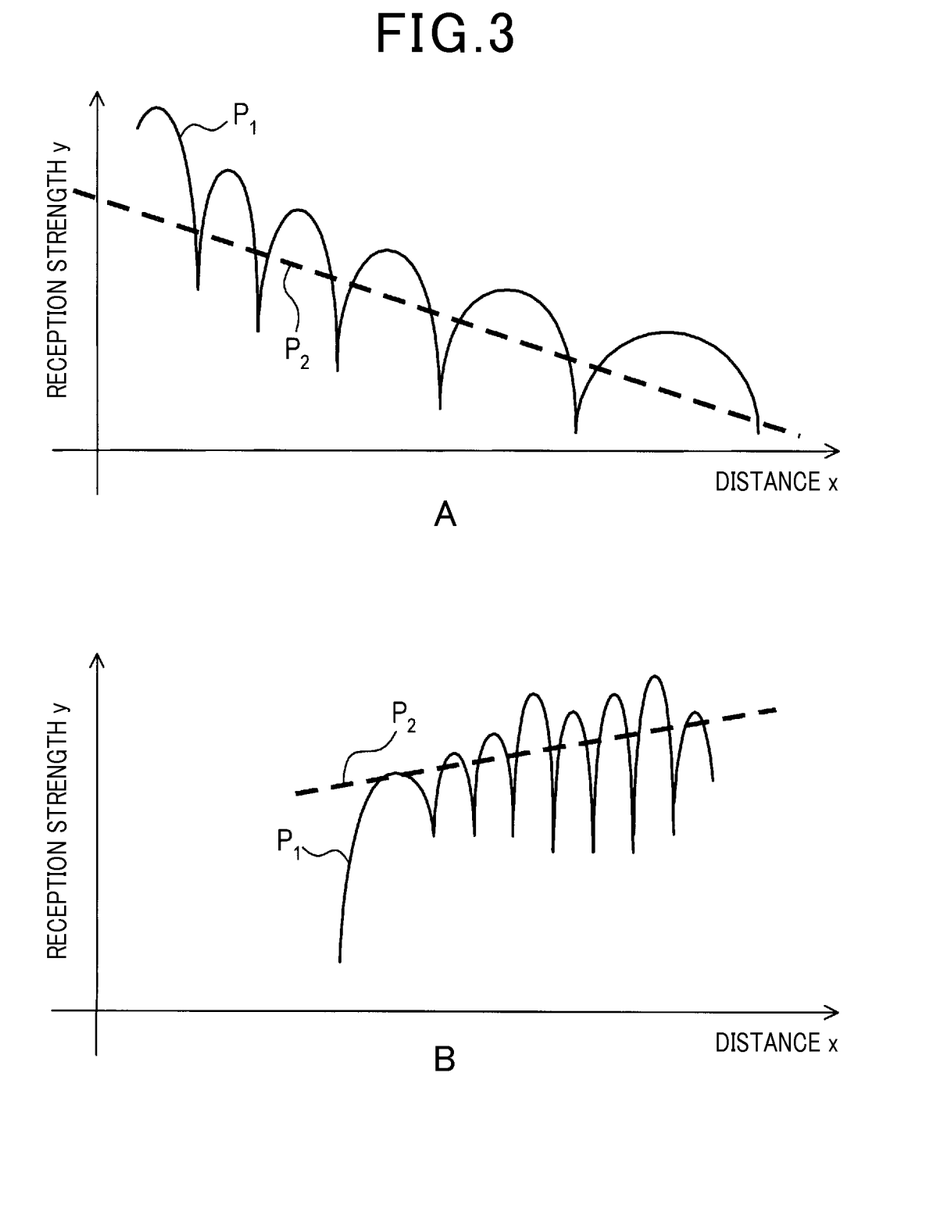
FIG. 3A is an explanatory diagram showing a relationship between distance x and reception strength y when a target is not an object above road.
FIG. 3B is an explanatory diagram showing a relationship between distance x and reception strength y when a target is an object above road.
Figure 4:
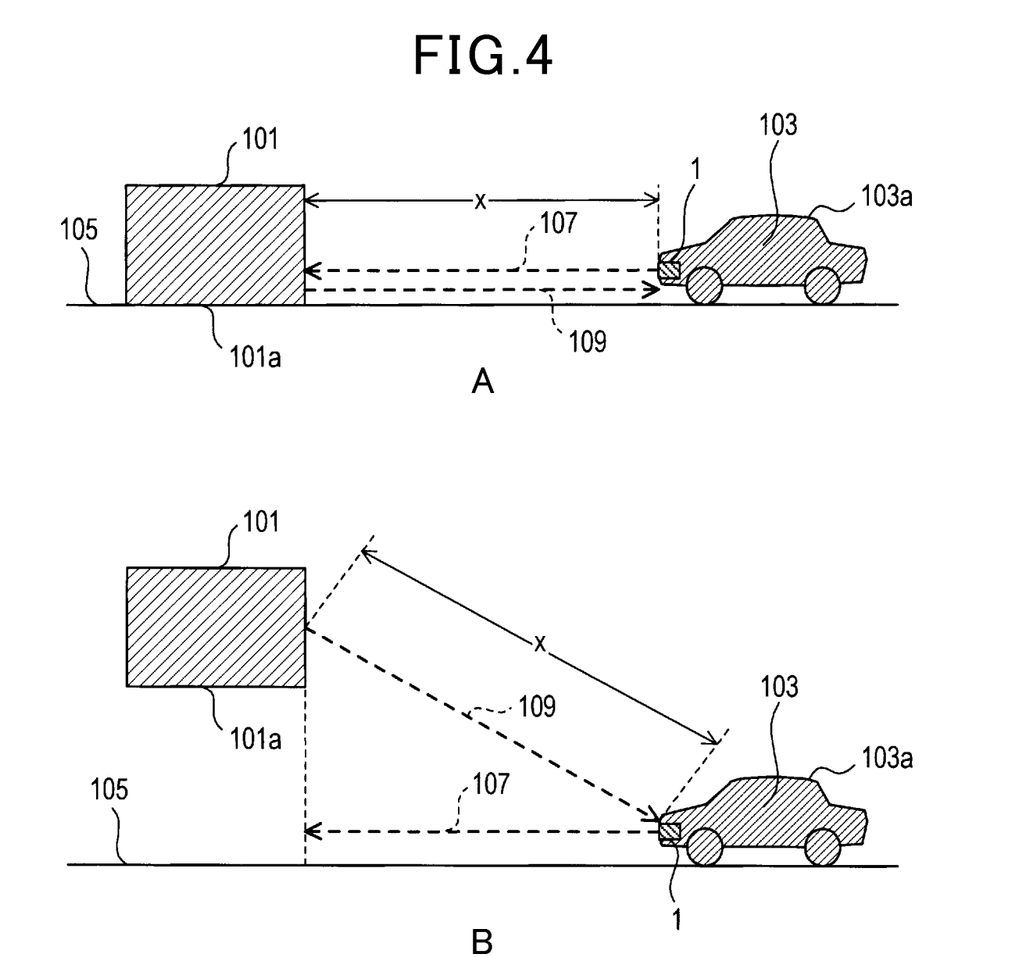
FIG. 4A is an explanatory diagram showing an own vehicle 103 and a target 101 which is not an object above road.
FIG. 4B is an explanatory diagram showing the own vehicle 103 and the target 101 which is an object above road.

A process, which is repeatedly performed by the in-vehicle radar apparatus 1 at predetermined intervals during the own vehicle travels, is described based on FIG. 2 to FIG. 4. In step 1 of FIG. 2, the signal processing section 10 calculates and stores the distance x to the target present ahead of the own vehicle and the reception strength y of the reflected wave received from the target.

In step 2, for the same target, the signal processing section 10 reads out a plurality sets of the distance x to the target and the reception strength y of the reflected wave received from the target, which have been repeatedly stored by the process of the step 1 performed a plurality of times in the past, and calculates a primary approximation expression expressing the reception strength y of the reflected wave by using the distance x as a variable. This primary approximation expression is represented by the following expression 1:

$$y=ax+k \qquad \text{(Expression 1)}$$

where a is a constant expressing a slope. In addition, k is a constant expressing a y intercept.

Note that, in the step 2, the signal processing section 10 calculates a primary approximation expression by using the reception strength y and the distance x acquired within a range (distance or period of time) longer than a periodical change period of the reception strength due to the influence of multipath described later.

In step 3, the signal processing section 10 determines whether or not the slope a of the primary approximation expression calculated in the step 2 is a positive value (a value more than 0). The process proceeds to step 4 if the slope a is a positive value, and the process ends if the slope a is 0 or a negative value.

Note that an example where the slope a is a negative value in the primary approximation expression is shown in FIG. 3A, and an example where the slope a is a positive value is shown in FIG. 3B. The FIG. 3A and FIG. 3B show transition $P_1$ of calculated values of the reception strength y and a primary approximation expression $P_2$.

The periodical variation of the reception strength y in the transition $P_1$ is generated due to the influence of multipath. As describe above, since the primary approximation expression is calculated by using the reception strength y and the distance x acquired within a range sufficiently longer than a periodical change period of the reception strength due to the influence of multipath, the primary approximation expression is hardly affected by the influence of multipath.

The primary approximation expression shown in FIG. 3A is a primary approximation expression unique to a case where the target is present ahead of the own vehicle, and the height from a road surface to the lower end of the target is low (the lower end of the target is lower than the upper end of the own vehicle, and the own vehicle cannot pass under the target).

This is because, as shown FIG. 4A, when a target 101 is present ahead of an own vehicle 103, and the height from a road surface 105 to a lower end 101a of the target 101 is low, the reception strength y of a reflected wave 109, which corresponds to a radar wave 107 reflected from the target 101 after the in-vehicle radar apparatus 1 transmits the radar wave 107 forward, becomes larger as the distance x between the own vehicle 103 and target 101 becomes smaller.

The primary approximation expression shown in FIG. 3B is a primary approximation expression unique to a case where the height from the road surface to the lower end of the target present ahead of the own vehicle is high (the lower end of the target is higher than the upper end of the own vehicle, and the own vehicle can pass under the target).

This is because, as shown FIG. 4B, when the height from the road surface 105 to the lower end 101a of the target 101 is high, the reception strength y of the reflected wave 109, which corresponds to the radar wave 107 reflected from the target 101 after the in-vehicle radar apparatus 1 transmits the radar wave 107 forward, becomes smaller as the distance x between the own vehicle 103 and target 101 becomes smaller.

That is, in the step 3, the signal processing section 10 determines whether the height from the road surface to the lower end of the target is high (the slope a is a positive value) or the height from the road surface to the lower end of the target is low (the slope a is 0 (set threshold value) or a negative value).

In step 4, the signal processing section 10 determines whether or not the distance x (value measured most recently) to the target corresponding to the primary approximation expression calculated in the step 2 is not more than a predetermined threshold value. If the distance x is not more than the threshold value, the process proceeds to step 5. If the distance x is more than the threshold value, the process ends.

In step 5, the signal processing section 10 determines that the height from the road surface to the lower end of the target, which corresponds to the primary approximation expression calculated in the step 2, is high, and therefore the own vehicle can pass under the target (hereinafter, referred to as an object above road).

3. Advantages Provided by In-Vehicle Radar Apparatus 1

(1) The in-vehicle radar apparatus 1 can determine whether or not the detected target is an object above road. Hence, for example, when determining whether or not the detected target is an object above road by using the in-vehicle radar apparatus 1, and if it is an object above road, not performing the collision avoidance process can restrain the unnecessary collision avoidance process for the object above road.

(2) The in-vehicle radar apparatus 1 calculates a primary approximation expression as an approximation expression expressing the reception strength y of the reflected wave by using the distance x as a variable. Hence, processing load of the signal processing section 10 can be reduced.

4. Modifications (1) The approximation expression calculated in the step 2 may be a secondary approximation expression expressing the reception strength y of the reflected wave by using the distance x as a variable. This secondary approximation expression is represented by the following expression 2:

$$y = \alpha(x-\beta)^2 + \gamma \quad \text{(Expression 2)}$$

where $\alpha$, $\beta$, $\gamma$ are respectively constants.

In this case, in the step 3, whether or not the target, which is an object of the secondary approximation expression, is an object above road is determined from $\alpha$, $\beta$, $\gamma$. Specifically, the in-vehicle radar apparatus 1 previously stores $\alpha$, $\beta$, $\gamma$, used when the height from the road surface to the lower end of the target is high, and $\alpha$, $\beta$, $\gamma$ used when the height from the road surface to the lower end of the target is low, in the ROM of the signal processing section 10. In addition, the in-vehicle radar apparatus 1 compares $\alpha$, $\beta$, $\gamma$ of the secondary approximation expression calculated in step 2 with $\alpha$, $\beta$, $\gamma$ stored in the ROM to determine whether or not the height from the road surface to the lower end of the target is high (that is, whether or not the target is an object above road).

Also in this case, the advantages substantially similar to those of the case in which the primary approximation expression is used can be provided.

(2) The approximation expression calculated in the step 2 may be a third-order or more approximation expression expressing the reception strength y of the reflected wave by using the distance x as a variable. Also in this case, in the step 3, whether or not the height from the road surface to the lower end of the target is high (that is, whether or not the target is an object above road) can be determined from coefficients of the third-order or more approximation expression.

Second Embodiment

1. Configuration of In-Vehicle Radar Apparatus 1

The in-vehicle radar apparatus 1 of the second embodiment has a configuration similar to that of the first embodiment.

2. Process Performed by In-Vehicle Radar Apparatus 1

Figure 5:
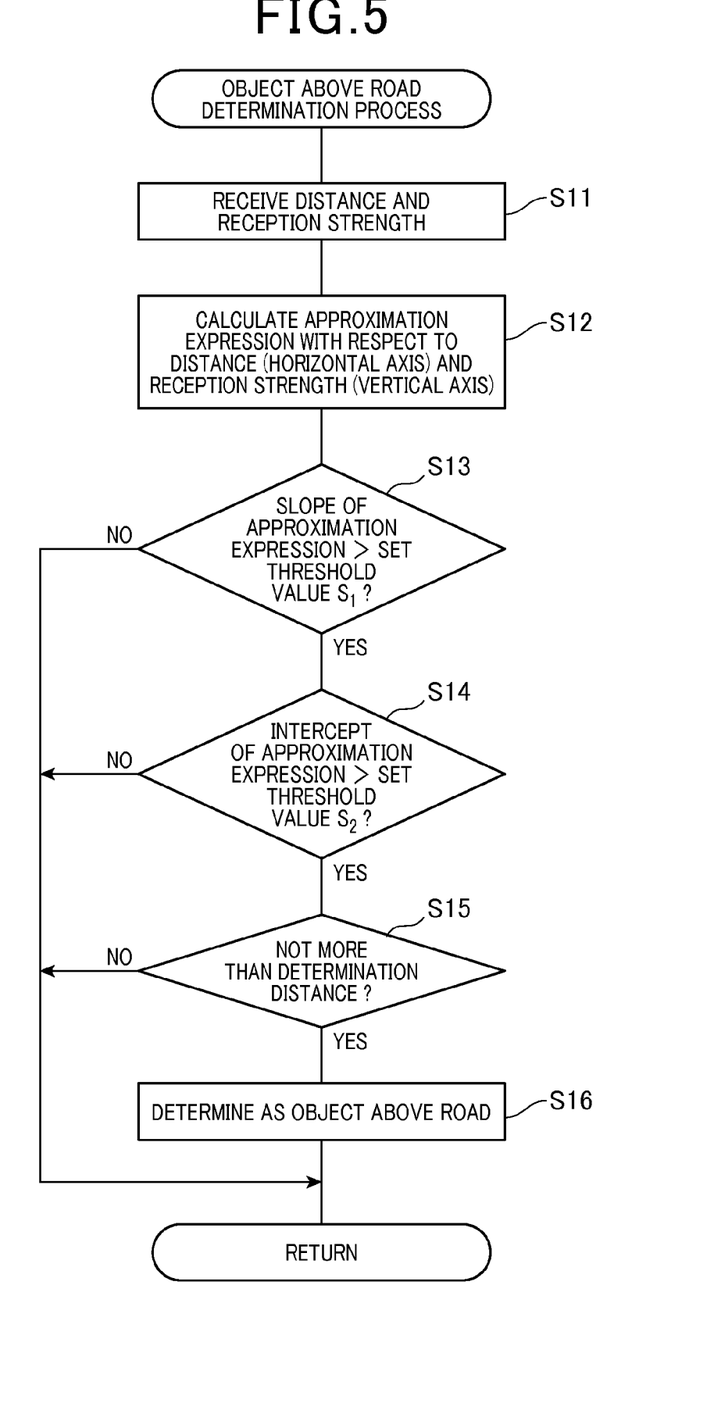
FIG. 5 is a flowchart showing an object above road determination process performed by the in-vehicle radar apparatus 1.
Figure 6:
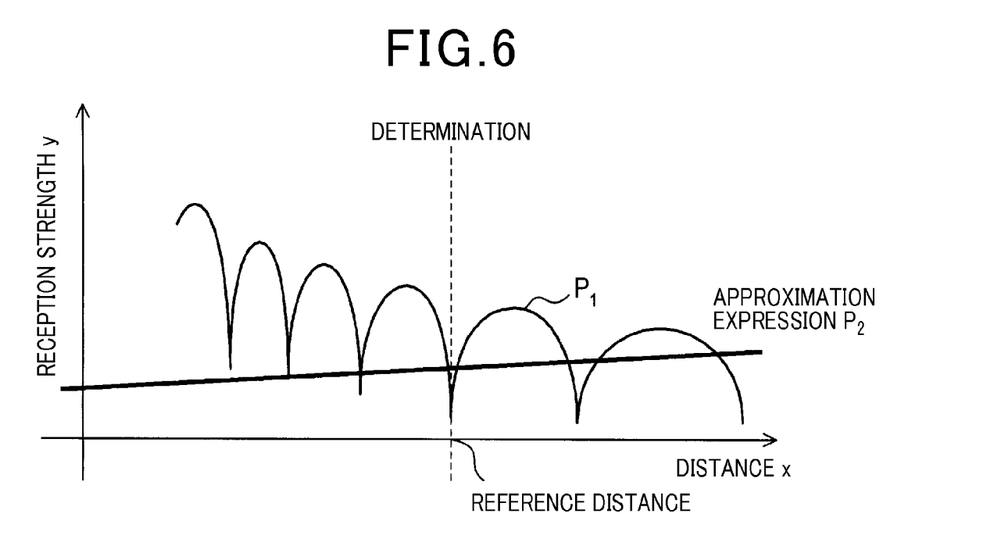
FIG. 6 is an explanatory diagram showing one example of a correlative relationship between distance x and reception strength y concerning a target which is not an object above road.

A process, which is repeatedly performed by the in-vehicle radar apparatus 1 at predetermined intervals during the own vehicle travels, is described based on FIG. 5 to FIG. 6. In step 11 of FIG. 5, the signal processing section 10 calculates and stores the distance x to the target present ahead of the own vehicle and the reception strength y of the reflected wave received from the target.

In step 12, for the same target, the signal processing section 10 reads out a plurality sets of the distance x to the target and the reception strength y of the reflected wave received from the target, which have been repeatedly stored by the process of the step 11 performed a plurality of times in the past, and calculates a primary approximation expression expressing the reception strength y of the reflected wave by using the distance x as a variable. The primary approximation expression is represented by the expression 1

Note that, in the step 12, the signal processing section 10 calculates a primary approximation expression by using the reception strength y and the distance x acquired within a range (distance or period of time) longer than periodical change period of the reception strength due to the influence of multipath.

In step 13, the signal processing section 10 determines whether or not the slope a of the primary approximation expression calculated in the step 12 is larger than a set threshold value $S_1$. The threshold value $S_1$ is a positive value. In the process, if the slope a is larger than the set threshold value S1, the process proceeds to step 14. If the slope a is not more than the set threshold value $S_1$, the process ends.

As described above, when the slope a is a positive value, it is a case where the height from the road surface to the lower end of the target is high. Hence, when the slope a is further larger than the set threshold value $S_1$, which is a positive value, it naturally corresponds to a case where the height from the road surface to the lower end of the target is high.

Hence, in the step 13, it can be determined that the height from the road surface to the lower end of the target is high based on whether or not the slope a is larger than the set threshold value $S_1$.

In step 14, the signal processing section 10 calculates the reception strength y obtained when the distance x is a predetermined reference distance (hereinafter, referred to as an approximate expression intercept) by the primary approximation expression calculated in the step 12, and determines whether or not the approximate expression intercept is larger than a predetermined set threshold value $S_2$. If the approximate expression intercept is larger than the set threshold value $S_2$, the process proceeds to step 15. If the approximate expression intercept is not more than the set threshold value $S_2$, the process ends. Note that the set threshold value $S_2$ is a variable threshold value, and is determined by the set threshold value $S_1$.

In step 15, the signal processing section 10 determines whether or not the distance (value measured most recently) to the target corresponding to the primary approximation expression calculated in the step 12 is not more than a predetermined threshold value. If the distance is not more than the threshold value, the process proceeds to step 16. If the distance is more than the threshold value, the process ends.

In step 16, the signal processing section 10 determines that the target, which corresponds to the primary approximation expression calculated in the step 12, is an object above road.

3. Advantages Provided by In-Vehicle Radar Apparatus 1

(1) The in-vehicle radar apparatus 1 of the second embodiment can provide the advantages similar to those of the first embodiment.

(2) In the second embodiment, the condition of affirmative judgment in the step 13 is stricter than the condition in the step 3 of the first embodiment (positive value). Hence, for example, as shown in FIG. 6, even when the slope a of the primary approximation expression calculated for a target, which is not an object above road practically, is slightly larger than 0, the target is not erroneously determined to be an object above road.

(3) In the second embodiment, as a condition for determining that a target is an object above road, the affirmative judgment in the step 14 is included. Hence, for example, as shown in FIG. 6, even when the primary approximation expression becomes inaccurate due to the totally low reception strength y, and the slope a becomes larger than the set threshold value $S_1$ (even if affirmative judgment is made in the step 13) in the primary approximation expression, which is calculated for a target which is not an object above road practically, negative judgment is made in the step 14. Therefore, the target is not erroneously determined to be an object above road.

4. Modifications (1) The approximate expression calculated in the step 12 may be a secondary approximation expression expressing the reception strength y of the reflected wave by using the distance x as a variable. This secondary approximation expression is expressed as the expression 2.

In this case, in the step 13, it is determined whether or not the target corresponding to the secondary approximation expression is an object above road from α, β, γ. Also in this case, the advantages substantially similar to those of the case in which the primary approximation expression is used can be provided.

(2) The approximation expression calculated in the step 12 may be a third-order or more approximation expression expressing the reception strength y of the reflected wave by using the distance x as a variable. Also in this case, in the step 13, whether or not the target corresponding to the third-order or more approximation expression is an object above road can be determined from coefficients of the third-order or more approximation expression.

The in-vehicle radar apparatus includes a transmission and reception means which transmits a radar wave ahead of an own vehicle and receives a reflected wave corresponding to the radar wave from a target; a reception strength detection means which repeatedly detects reception strength of the reflected wave; a distance detection means which repeatedly detects a distance from the own vehicle to the target; and an approximate expression calculation means which calculates an approximation expression expressing the reception strength using the distance as a variable from the reception strength repeatedly detected by the reception strength detection means and the distance repeatedly detected by the distance detection means. The in-vehicle radar apparatus can calculate the approximation expression expressing a correlative relationship between the distance from the own vehicle to the target and the reception strength of the reflected wave.

In a case of a target present above the road, as the distance from the own vehicle to the target decreases, the reception strength of the reflected wave decreases. In addition, values of the coefficients of the approximation expression are unique to the case. Hence, the in-vehicle radar apparatus can determine the height of the target from the road surface based on the values of the coefficients of the approximation expression.

Note that the present invention is not limited to the embodiments, but various embodiments can be implemented within the scope of the present invention.

REFERENCE SIGNS LIST

1 . . . in-vehicle radar apparatus
4 . . . transmitter
6 . . . receiver
8 . . . A/D conversion section
10 . . . signal processing section
12 . . . high-frequency oscillator
14 . . . distributor
101 . . . target
101*a* . . . lower end
103 . . . own vehicle
105 . . . road surface
107 . . . radar wave
109 . . . reflected wave
A/D1 to A/DN . . . converter
AMP1 to AMPN . . . amplifier
AR1 to ARN . . . reception antenna
AS . . . transmission antenna
MX1 to MXN . . . high frequency mixer

The invention claimed is:

1. An in-vehicle radar apparatus comprising:
a transmission and reception means which transmits a radar wave ahead of an own vehicle and receives a reflected wave corresponding to the radar wave from a target;

a reception strength detection means which repeatedly detects reception strength of the reflected wave;

a distance detection means which repeatedly detects a distance from the own vehicle to the target;

an approximate expression calculation means which calculates an approximation expression expressing the reception strength using the distance as a variable from the reception strength repeatedly detected by the reception strength detection means and the distance repeatedly detected by the distance detection means; and a determination means which determines a height of the target from a road surface based on values of coefficients of the approximation expression.

2. The in-vehicle radar apparatus according to claim 1, wherein the approximate expression calculation means calculates the approximation expression by using the reception strength and the distance acquired within a range longer than a change period of the reception strength due to an influence of multipath.

3. The in-vehicle radar apparatus according to claim 1, wherein the determination means performs the determination on condition that the reception strength of the approximate expression obtained when the distance is a predetermined reference distance exceeds predetermined reference reception strength.

4. The in-vehicle radar apparatus according to claim 1, wherein the approximate expression is a primary approximation expression, and the determination means determines that the target is present above the own vehicle when a value of a constant of proportionality of the primary approximation expression exceeds a predetermined threshold value.

5. The in-vehicle radar apparatus according to claim 1, wherein the approximate expression is a primary approximation expression, and the determination means determines that the target is present above the own vehicle when a value of a constant of proportionality of the primary approximation expression exceeds a predetermined threshold value, and when a distance to the target corresponding to the primary approximation expression is not more than a predetermined threshold value.

6. The in-vehicle radar apparatus according to claim 1, wherein the approximate expression is a primary approximation expression, and the determination means determines that the target is present above the own vehicle when a value of a constant of proportionality of the primary approximation expression exceeds a predetermined threshold value, and when an intercept of the primary approximation expression exceeds a predetermined threshold value.

7. The in-vehicle radar apparatus according to claim 1, wherein the approximate expression is a primary approximation expression, and the determination means determines that the target is present above the own vehicle when a value of a constant of proportionality of the primary approximation expression exceeds a predetermined threshold value, when an intercept of the primary approximation expression exceeds a predetermined threshold value, and when a distance to the target corresponding to the primary approximation expression is not more than a predetermined threshold value.

8. The in-vehicle radar apparatus according to claim 1, wherein the approximate expression is a secondary approximation expression, and the determination means performs the determination based on values of coefficients of the secondary approximation expression which are one or more.

* * * * *